US012644867B2

(12) United States Patent
Akieda et al.

(10) Patent No.: US 12,644,867 B2
(45) Date of Patent: Jun. 2, 2026

(54) LIQUID CHROMATOGRAPH AND METHOD FOR CONTROLLING SAME

(71) Applicant: HITACHI HIGH-TECH CORPORATION, Tokyo (JP)

(72) Inventors: Daisuke Akieda, Tokyo (JP); Yushi Harada, Tokyo (JP); Mitsuhiko Ueda, Tokyo (JP); Shoji Tomida, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 282 days.

(21) Appl. No.: 18/555,564

(22) PCT Filed: Feb. 21, 2022

(86) PCT No.: PCT/JP2022/006857
§ 371 (c)(1),
(2) Date: Oct. 16, 2023

(87) PCT Pub. No.: WO2022/224577
PCT Pub. Date: Oct. 27, 2022

(65) Prior Publication Data
US 2024/0201144 A1 Jun. 20, 2024

(30) Foreign Application Priority Data
Apr. 19, 2021 (JP) ................................. 2021-070544

(51) Int. Cl.
*G01N 30/32* (2006.01)
*G01N 30/02* (2006.01)
(Continued)

(52) U.S. Cl.
CPC ............. *G01N 30/32* (2013.01); *G01N 30/14* (2013.01); *G01N 30/62* (2013.01); *G01N 30/86* (2013.01);
(Continued)

(58) Field of Classification Search
None
See application file for complete search history.

(56) References Cited

U.S. PATENT DOCUMENTS 6,315,901 B1 11/2001 Okada
6,955,760 B2 * 10/2005 Iwata ................... G01N 30/462
210/101

(Continued)

FOREIGN PATENT DOCUMENTS

JP S55-128678 A 10/1980
JP S56-139127 A 10/1981
(Continued)

OTHER PUBLICATIONS

International Search Report, mailed May 17, 2022, for International Application No. PCT/JP2022/006857.
(Continued)

*Primary Examiner* — Daniel S Larkin
(74) *Attorney, Agent, or Firm* — Baker Botts L.L.P.

(57) ABSTRACT

A liquid chromatography (LC) that can supply a mobile phase to a storage bottle and can prevent mixing of air bubbles into a flow path without stopping analysis and liquid feeding. The LC includes a liquid feeding device that feeds out a mobile phase, a sample injection portion that injects a sample into the mobile phase, a column that separates the sample carried by the mobile, and a detection device that detects the sample. The LC further comprises a storage bottle that stores the mobile phase fed by the liquid feeding device, a mobile phase supply bottle that supplies the mobile phase to the storage bottle, a mobile phase supply pump that supplies the mobile phase to the storage bottle, and a control unit that controls an operation of the mobile phase supply pump and determines an amount of the mobile phase to be supplied to the storage bottle.

8 Claims, 6 Drawing Sheets

(51) Int. Cl.
G01N 30/14 (2006.01)
G01N 30/62 (2006.01)
G01N 30/86 (2006.01)

(52) U.S. Cl.
CPC ... G01N 30/8651 (2013.01); G01N 2030/027
(2013.01); G01N 2030/326 (2013.01)

(56) References Cited

U.S. PATENT DOCUMENTS

| | | | |
|---|---|---|---|
| 2006/0201885 A1* | 9/2006 | Davison | G01F 23/168 |
| | | | 210/741 |
| 2008/0183401 A1 | 7/2008 | Davison et al. | |
| 2021/0080436 A1 | 3/2021 | Koga et al. | |

FOREIGN PATENT DOCUMENTS

| | | | |
|---|---|---|---|
| JP | S60-243562 A | | 12/1985 |
| JP | H03223671 A | * | 10/1991 |
| JP | 2000-298122 A | | 10/2000 |
| JP | 2011-521323 A | | 7/2011 |
| JP | 4778748 B2 | | 9/2011 |
| JP | 2021-043099 A | | 3/2021 |
| WO | WO 2020-183771 A1 | | 9/2020 |

OTHER PUBLICATIONS

Written Opinion, mailed May 17, 2022, for International Application No. PCT/JP2022/006857 (without English translation).

* cited by examiner

[FIG. 1]
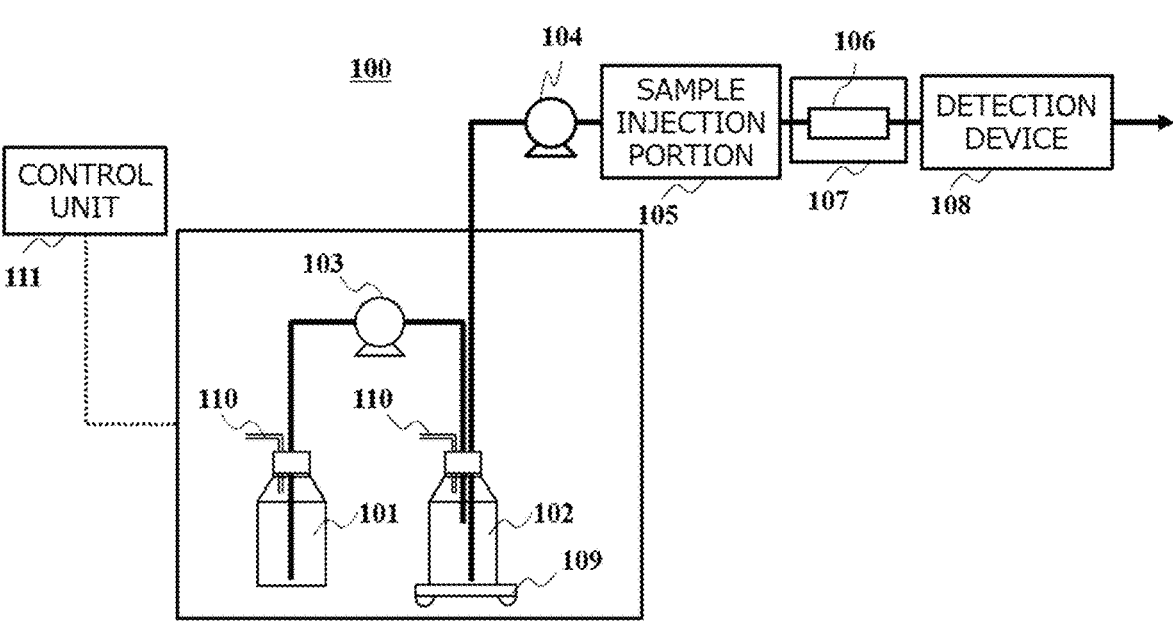

[FIG. 2]
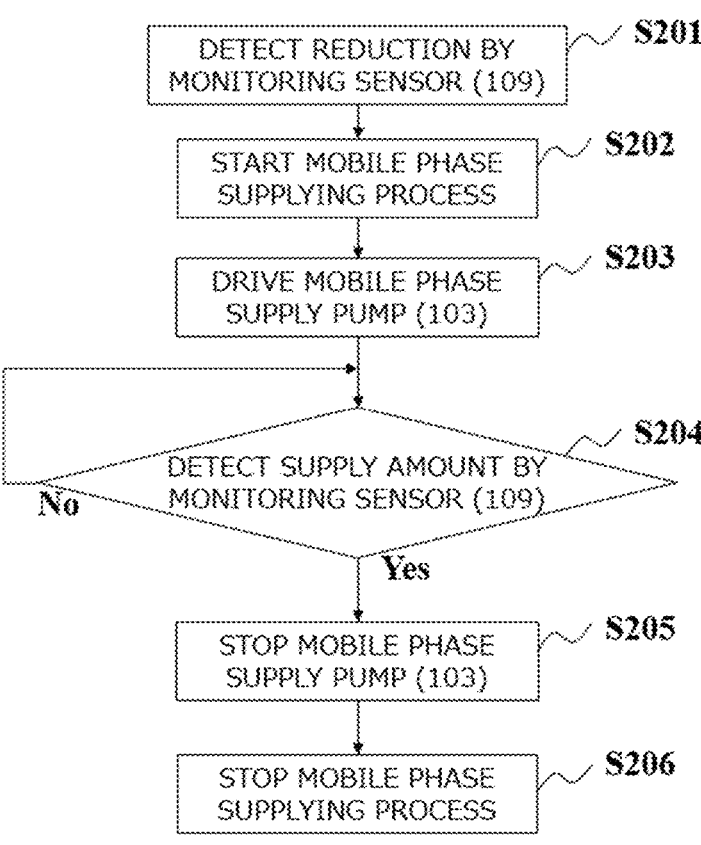

[FIG. 3]
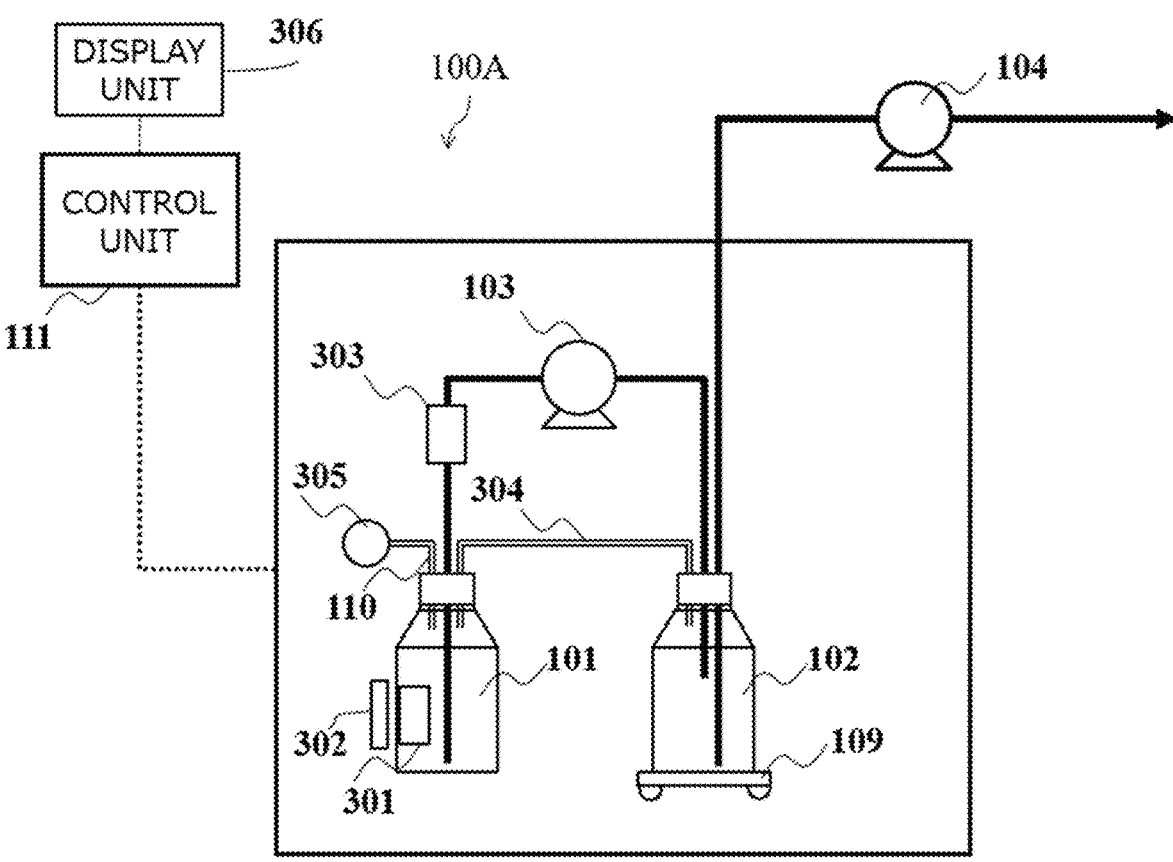

[FIG. 4]
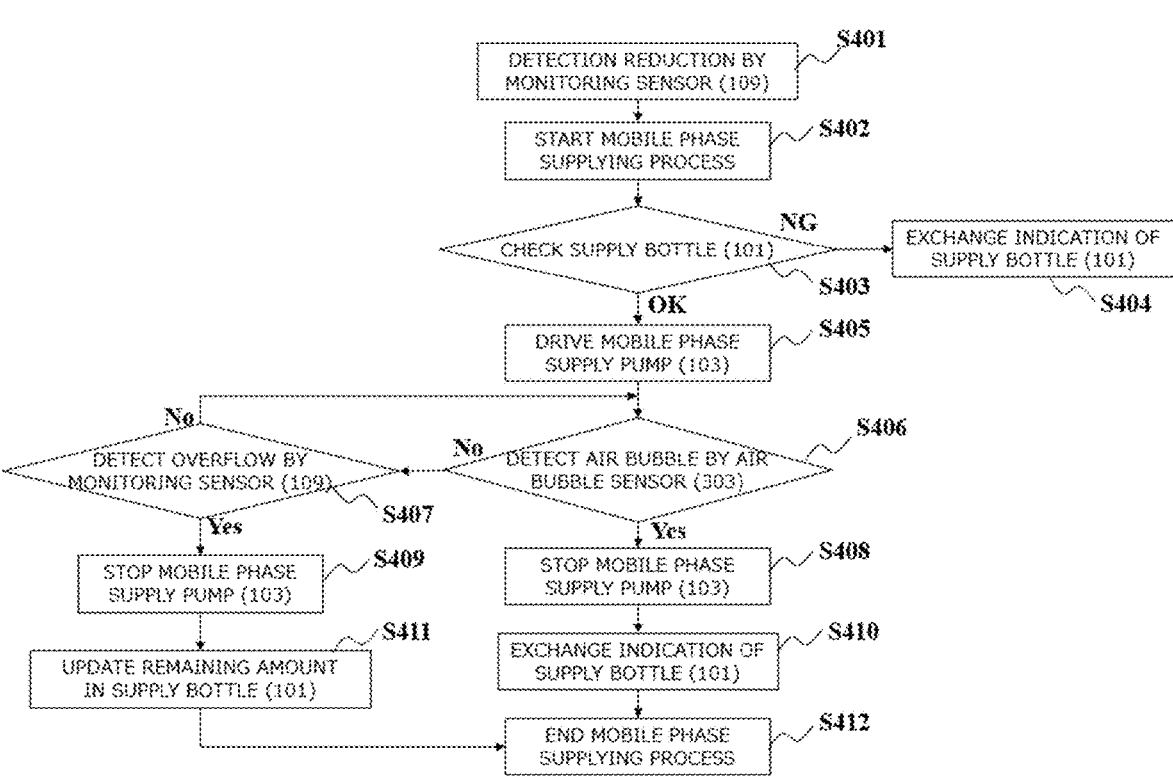

[FIG. 5]
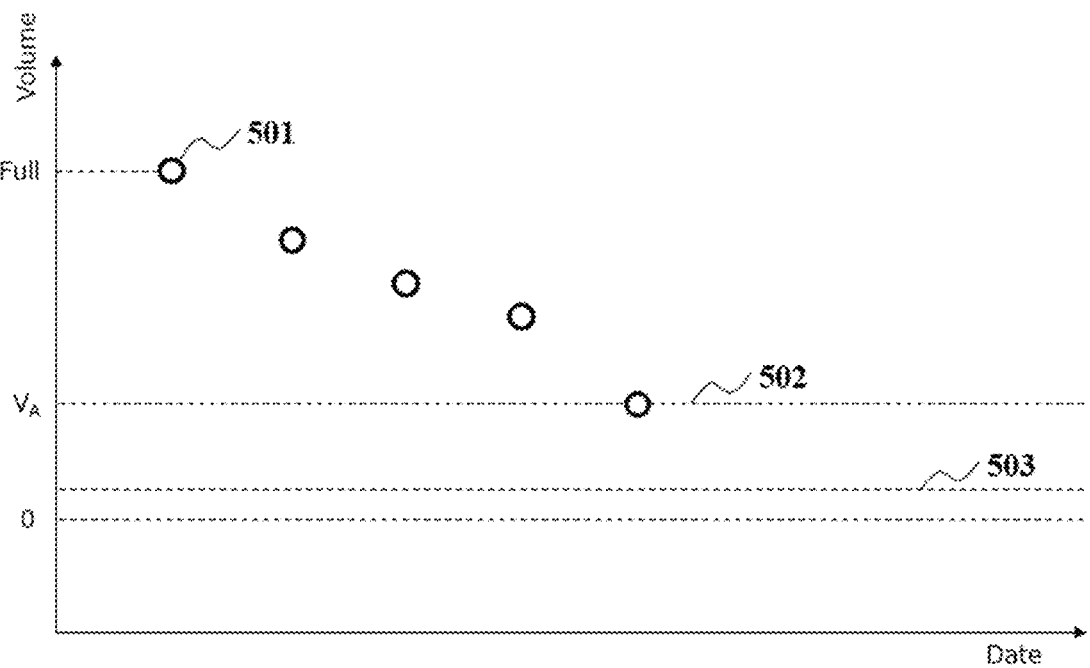

[FIG. 6]
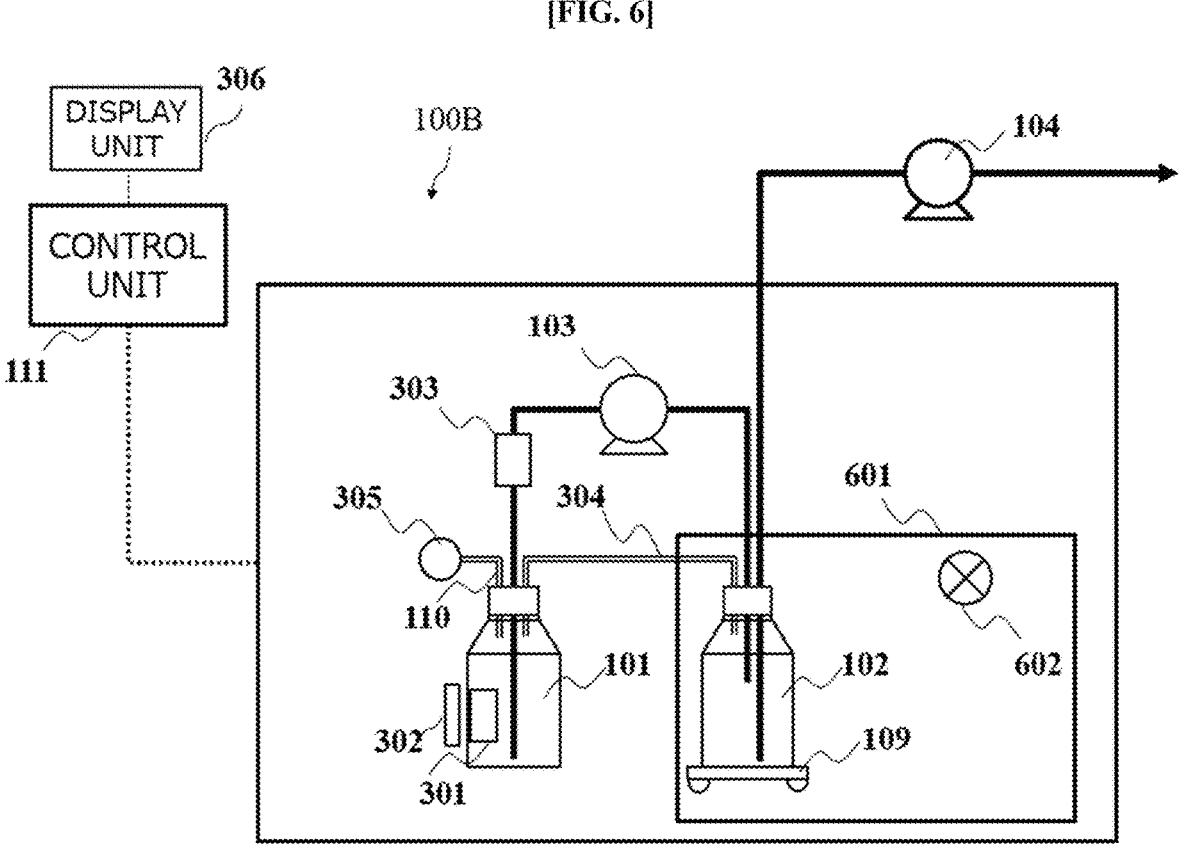

LIQUID CHROMATOGRAPH AND METHOD FOR CONTROLLING SAME

CROSS REFERENCE TO RELATED APPLICATIONS

This application is a U.S. National Stage Patent Application under 35 U.S.C. § 371 of International Patent Application Serial No. PCT/JP2022/006857, filed Feb. 21, 2022, which claims benefit of foreign priority to Japanese Patent Application No. 2021-070544, filed Apr. 19, 2021. The entire contents of both applications are incorporated by reference herein.

TECHNICAL FIELD

The present invention relates to a liquid chromatograph and a method for controlling the liquid chromatograph.

BACKGROUND ART

The liquid chromatograph (LC) is an analysis method in which a liquid sample that is a measurement target is introduced into a column that separates the liquid sample into components contained in the liquid sample with a liquid mobile phase and the separated components are detected by a detector connected to the downstream side of the column. In order to detect the components of the liquid sample separated in the column, a detection device, such as an ultraviolet-visible absorption spectrophotometer, a fluoro-photometer, and a mass spectrometer are connected on the downstream side of the column.

The main part of the separation performance of the LC is determined according to the type of a packing that is packed in the column. For example, nowadays, with the use of an ultra-high performance liquid chromatograph (UHP) that achieves high separation and highly sensitive analysis by packing a packing having a small diameter of 2 μm or less in a column, continuous analysis of multiple samples is performed, resulting in improved throughput.

In the LC, the mobile phase fed from a liquid feeding device not only serves the function of carrying the measurement target sample but also serves the function of separating the measurement target sample into components according to the difference of an affinity for the stationary phase of the packing packed in the column. In the LC, various types of mobile phases, such as ultrapure water, an organic solvent, and a buffer solvent, are used, and an operator selects a mobile phase used in an LC system corresponding to purposes for measurement and to types of liquid samples.

As described above, the mobile phase used in the LC serves the function of carrying a measurement sample, on one hand, and at the same time, the mobile phase affects measured results, on the other hand. For example, when air bubbles in the mobile phase are mixed in the liquid feeding device or the downstream passage of the liquid feeding device, this sometimes results in a great change in the measured results. Therefore, the operator using the LC monitors the remaining amount of the mobile phase so as not to enter air bubbles into the inside of the analysis passage of the LC, and the operator replaces and supplies the mobile phase when the amount of the mobile phase is a certain amount or less, and analysis is continued.

In the LC, during the progress of the analysis process, the liquid feeding device continuously feeds the mobile phase to the column and the detection device all the time. Therefore, in the case in which the remaining amount of the mobile phase decreases, since the operator has to temporarily stop the LC to conduct the replacement work of the mobile phase, the operator has to conduct experiments while confirming the volume of the mobile phase to be consumed in analysis and the remaining amount of a solvent that is provided.

Therefore, in order to avoid an event that air is absorbed due to a shortage of the solvent in the bottle, the LC is sometimes assembled with a liquid level detection sensor that detects the remaining amount of the solvent on a solvent supply bottle or with a function of obviating the mixing of air bubbles into the analyzer by detecting the remaining amount by a weight detection sensor, for example.

As a monitoring method or a management method for the mobile phase used in the LC, Patent Literature 1 shows a method in which the liquid feeding device of an LC calculates the consumed volume and the remaining amount of a mobile phase from a discharge flow rate, time, mixing conditions for the mobile phase, and the like.

Moreover, Patent Literature 2 shows a system in which a sensor that monitors the remaining amount of a mobile phase is provided at a site where the mobile phase used by an LC is provided to conduct the monitoring of the remaining amount and an operator is notified in the case in which the remaining amount reaches a certain value or less.

Moreover, Patent Literature 3 shows a system that monitors the amount of consumption and the remaining amount for individual types of solvents from output values from a sensor monitoring the conditions for the mobile phase and the remaining amount of the mobile phase; the sensor is provided on a plurality of LCs connected on a network.

Mounting such a monitoring system on the LC enables the operator to recognize a reduction in the remaining amount of the mobile phase before the remaining amount of the mobile phase is reduced and this affects analysis, and the operator can conduct the replacement work or supply work of the mobile phase.

Here, a solvent replacement process for the mobile phase provided on the LC will be briefly described. Typically, the mobile phase is provided on the LC system in a state in which the mobile phase is packed in a glass or resin bottle. In the case in which the mobile phase in the bottle decreases, the analysis by the LC is stopped, the liquid feeding device is stopped, and the bottle is replaced with a new bottle filled with the mobile phase.

As described above, the mixing of air bubbles into the liquid feeding device causes unstable feeding of the mobile phase, sometimes resulting in the influence on analyzed results. Therefore, the operator using the LC progresses the work by paying close attention so as not to mix air bubbles in a supply tube at the time of replacement work of mobile phase bottles and the time of additional supply of the mobile phase to the bottle. However, it is difficult to make the possibility of mixing air bubbles zero. This is because not only simple oversights of air bubbles or operational mistakes by the operator and so on, but also the work experience of the operator, the installation environment of analyzers, and types of solvents for use cause influence.

Therefore, in most cases, as typical procedures, an air bubble discharge process for removing air bubbles in a pipe is conducted as a preparation operation after the replacement of mobile phase bottles or the work to additionally supply the mobile phase into bottles, regardless of the presence or absence of mixing of air bubbles.

CITATION LIST

Patent Literature

Patent Literature 1: Japanese Unexamined Patent Application Publication No. 2000-298122

Patent Literature 2: Japanese Patent No. 4778748

Patent Literature 3: WO2020/183771A1

SUMMARY OF INVENTION

Technical Problem

Nowadays, in the LC, automation proceeds in multiple functional aspects. Like the techniques described in Patent Literature 1 to 3, an automatic monitoring system and a system for notifying operators are also provided in regard to the remaining amount of the mobile phase.

However, in the case in which the bottle of the mobile phase is actually replaced or the mobile phase is added to the bottle, the analysis of the LC and the liquid feeding device have to be temporarily stopped, and the operator has to conduct the replacement work and the preparation operation after the replacement.

Since this work depends on the operator, the operator is inevitably constrained for a certain period of time in order to conduct the preparation operation, including bottle replacement and mobile phase supply work after recognizing the notification of a reduction in the remaining amount of the mobile phase.

Moreover, the work by the operator may cause risks to other problems, such as the mixing of air bubbles in the passage. Also, from the viewpoint of analysis time, time for which the LC is not allowed for use occurs, and this might cause a situation in which throughput is reduced as well as analysis is stopped for a longer time when the operator is not able to recognize the notification of a reduction in the remaining amount of the mobile phase.

An object of the present invention is to realize a liquid chromatograph and a method for controlling a liquid chromatograph that are capable of supplying a mobile phase to a storage bottle and capable of suppressing the mixing of air bubbles into a passage.

Solution to Problem

In order to achieve the object, the present invention is configured as below.

A liquid chromatograph includes: a liquid feeding device configured to feed out a mobile phase; a sample injection portion configured to inject a sample into the mobile phase fed out from the liquid feeding device; a separation column configured to separate the sample carried by the mobile phase fed out from the sample injection portion; and a detection device configured to detect the sample separated by the separation column. The liquid chromatograph further includes: a storage bottle storing the mobile phase fed by the liquid feeding device; a mobile phase supply bottle configured to supply the mobile phase to the storage bottle; a mobile phase supply pump configured to supply the mobile phase stored in the mobile phase supply bottle to the storage bottle; and a control unit configured to control an operation of the mobile phase supply pump and determine an amount of the mobile phase to be supplied from the mobile phase supply bottle to the storage bottle.

A method for controlling a liquid chromatograph, the liquid chromatograph including: a liquid feeding device configured to feed out a mobile phase; a sample injection portion configured to inject a sample into the mobile phase fed out from the liquid feeding device; a column configured to separate the sample carried by the mobile phase fed out from the sample injection portion; and a detection device configured to detect the sample separated by the separation column, the method for controlling the liquid chromatograph includes: storing, in a storage bottle, the mobile phase fed by the liquid feeding device; storing the mobile phase in a mobile phase supply bottle that supplies the mobile phase to the storage bottle; determining an amount of the mobile phase to be supplied from the mobile phase supply bottle to the storage bottle; and supplying the mobile phase stored in the mobile phase supply bottle to the storage bottle by controlling an operation of a mobile phase supply pump.

Advantageous Effects of Invention

According to the present invention, a liquid chromatograph and a method for controlling a liquid chromatograph that are capable of supplying a mobile phase to a storage bottle and that are capable of suppressing the mixing of air bubbles into a passage without stopping analysis and feeding.

BRIEF DESCRIPTION OF DRAWINGS

FIG. 1 is a schematic configuration diagram of a liquid chromatograph according to a first embodiment.

FIG. 2 is a flowchart of a process of supplying a mobile phase from a mobile phase supply bottle to a storage bottle according to the first embodiment.

FIG. 3 is a schematic configuration diagram of a liquid chromatograph according to a second embodiment.

FIG. 4 is a flowchart of a mobile phase supplying process according to the second embodiment.

FIG. 5 is an operation explanatory diagram according to a third embodiment.

FIG. 6 is a schematic configuration diagram of a liquid chromatograph according to a fourth embodiment.

DESCRIPTION OF EMBODIMENTS

In the following, embodiments of the present invention will be described with reference to the accompanying drawings. Although the accompanying drawings show the embodiments based on the principle of the present invention, the embodiments are typical exemplifications for understanding the principle of the present invention, and the embodiments do not limit the present invention.

EMBODIMENT

First Embodiment

Referring to FIG. 1, a first embodiment of the present invention will be described.

FIG. 1 is a schematic block diagram of a liquid chromatograph 100 according to the first embodiment of the present invention.

In FIG. 1, the liquid chromatograph 100 includes a liquid feeding device 104 that feeds a mobile phase, a sample injection portion 105 that introduces a measurement target sample (also simply referred to as a sample) into an analysis passage, a separation column 106 that separates the measurement target sample, which is introduced into the analysis passage and carried by the mobile phase fed by the liquid feeding device 104, into components, and a detection device 108 that detects the components contained in the measurement target sample and separated at the separation column 106.

Moreover, the liquid chromatograph 100 includes a storage bottle 102 that is provided on the upstream part of the liquid feeding device 104 and stores the mobile phase, a monitoring sensor 109 that detects the remaining amount of the mobile phase in the storage bottle 102, a mobile phase supply bottle 101 that stores the mobile phase in order to supply the mobile phase to the storage bottle 102, a mobile phase supply pump 103 that supplies the mobile phase from the mobile phase supply bottle 101 to the storage bottle 102, and a control unit 111 that monitors the remaining amount of the mobile phase and supplies the mobile phase.

On the mobile phase supply bottle 101 and the storage bottle 102, a vent 110 is provided to equal the bottle internal pressure to the atmospheric pressure. Therefore, one end of the vent 110 is disposed in the storage bottle 102, and the other end of the vent 110 opens to the atmosphere.

The separation column 106 of the liquid chromatograph 100 is housed in a thermostatic device 107 for use in order to maintain the column ambient temperature constantly. However, the separation column 106 may be used without being housed in the thermostatic device 107.

When the liquid chromatograph 100 is in operation, the liquid feeding device 104 carries the measurement target sample introduced from the sample injection portion 105 to the separation column 106, dissolves the measurement target sample from the separation column 106, and feeds a mobile phase suitable for analysis for the purpose of carrying the measurement target sample to the detection device 108.

FIG. 2 is a flowchart of a process for supplying the mobile phase from the mobile phase supply bottle 101 to the storage bottle 102 corresponding to the mobile phase that is decreasing when the liquid chromatograph 100 is in operation.

When the liquid feeding device 104 aspirates the mobile phase from the storage bottle 102 and supplies the mobile phase into the LC analysis system, this decreases the remaining amount of the mobile phase in the storage bottle 102, and the remaining amount of the mobile phase detected by the monitoring sensor 109 is a specified value or less, the control unit 111 determines that the remaining amount of the mobile phase in the storage bottle 102 is less (Step S201).

As the monitoring sensor 109 that monitors the remaining amount of the mobile phase, a weight sensor, a floating sensor, an electrostatic sensor, an optical sensor, and any other sensors are considered.

Upon detecting that the remaining amount of the mobile phase is a specified value or less by the monitoring sensor 109, the control unit 111 starts the mobile phase supply process (Step S202). Then, the mobile phase supply pump 103 is driven to start the supply of the mobile phase from the mobile phase supply bottle 101 to the storage bottle 102 (Step S203).

At the time of the supply of the mobile phase to the storage bottle 102 by the mobile phase supply pump 103, the control unit 111 determines whether the mobile phase in the storage bottle 102 reaches a certain amount or more based on the remaining amount of the mobile phase detected by the monitoring sensor 109 (Step S204). When the control unit 111 determines that the mobile phase in the storage bottle 102 is a certain amount or more, the control unit 111 stops the mobile phase supply pump 103 to stop the supply of the mobile phase to the storage bottle 102 from the mobile phase supply bottle 101 (Step S205). Then, the mobile phase supply process is stopped (ended) (Step S206).

As described above, according to the first embodiment of the present invention, a configuration is provided in which the amount of the mobile phase detected by the monitoring sensor 109 in the remaining amount of the mobile phase in the mobile phase storage bottle 102 is monitored, and when the remaining amount of the mobile phase in the storage bottle 102 reaches the specified value or less, the control unit 111 drives the mobile phase supply pump 103 to supply the mobile phase from the mobile phase supply bottle 101 to the storage bottle 102. Thus, the recognition of a reduction in the remaining amount of the mobile phase and the supply of the mobile phase by the operator is eliminated, and it is possible to avoid the mixing of air bubbles in the passage due to the operator's work as well.

In other words, according to the first embodiment, it is possible to realize the liquid chromatograph and the method for controlling a liquid chromatograph that are capable of supplying a mobile phase into the storage bottle 102 and capable of suppressing the mixing of air bubbles into the passage without stopping analysis and feeding.

Note that in the first embodiment, the timing of stopping the mobile phase supply pump 103 is decoded based on information on the remaining amount of the mobile phase in the storage bottle 102 determined by the monitoring sensor 109. For example, by a method in which the drive time of the mobile phase supply pump 103 is calculated from the discharge flow rate of the mobile phase supply pump 103 and the volume of the mobile phase that is desired to be supplied to the storage bottle 102 and the mobile phase supply pump 103 is operated and stopped based on the calculated drive time, it is also possible to realize a similar mobile phase supply process.

Moreover, the control unit 111 may calculate the remaining amount of the mobile phase in the storage bottle 102 from the feeding amount and operating time of the liquid feeding device 104 per time unit, determine that the remaining amount reaches a specified value or less, and drive the mobile phase supply pump 103 to start the supply of the mobile phase from the mobile phase supply bottle 101 to the storage bottle 109. In this case, as described above, a configuration is provided in which the drive time of the mobile phase supply pump 103 is calculated from the discharge flow rate of the mobile phase supply pump 103 and the volume of the mobile phase that is desired to be supplied to the storage bottle 102 and the mobile phase supply pump 103 is stopped based in the calculated drive time. This enables the omission of the monitoring sensor 109.

Second Embodiment

Next, a second embodiment of the present invention will be described with reference to FIG. 3.

In FIG. 3, a sample injection portion 105, a thermostatic device 107, and a detection device 108 on the downstream side of the liquid feeding device 104 are omitted from the drawings. A liquid chromatograph 100A includes a storage bottle 102 that is provided on the upstream part of a liquid feeding device 104 and stores a mobile phase, a monitoring sensor 109 that detects the remaining amount of the mobile phase in the storage bottle 102, a mobile phase supply bottle 101 that supplies the mobile phase into the storage bottle 102, an information storage unit 301 that is provided on the mobile phase supply bottle 101, an information reading unit 302 that reads information recorded in the information storage unit 301, a mobile phase supply pump 103 that supplies the mobile phase from the mobile phase supply bottle 101 to the storage bottle 102, an air bubble detection sensor 303 that detects air bubbles in a pipe provided between the mobile phase supply pump 103 and the mobile phase supply bottle 101, a display unit 306, and a control unit 111 that monitors the remaining amount of the mobile phase and supplies the mobile phase.

The inside of the mobile phase supply bottle 101 and the inside of the storage bottle 102 are connected to each other using a gas conduit 304 that is provided to equal the bottles' internal pressure. In other words, the gas conduit 304 connects the storage bottle 102 to the mobile phase supply bottle 101, and maintains the pressure in the storage bottle 102 and the pressure in the mobile phase supply bottle 101. Moreover, in the mobile phase supply bottle 101, one end of a vent 110 that equals the pressure in the mobile phase supply bottle 101 to the atmospheric pressure is disposed. The other end of the vent 110 located on the outer side of the mobile phase supply bottle 101 is connected to a filter 305 that obviates the external spread of the mobile phase in the supply bottle 101 and that obviates the penetration of dirt and dust around the mobile phase supply bottle 101 into the inside of the mobile phase supply bottle 101.

The information storage unit 301 of the mobile phase supply bottle 101 stores information on the mobile phase, such as the type, date of manufacture, and the like of the mobile phase housed in the mobile phase supply bottle 101. The control unit 111 determines that the mobile phase supply bottle 101 is appropriately provided from the presence or absence of the provision of the mobile phase supply bottle 101, faulty provision, and the expiration date, based on the information read by the information reading unit 302 and stored in the information storage unit 301.

As the information storage unit 301, an RFID tag and the like are considered.

FIG. 4 is a flowchart of a mobile phase supply process according to the second embodiment of the present invention.

When the remaining amount of the mobile phase reaches a specified value or less, which is determined from the detected value of the monitoring sensor 109, the control unit 111 determines that the remaining amount of the mobile phase in the storage bottle 102 is less (Step S401), and starts the mobile phase supply process (Step S402).

After starting the mobile phase supply process in Step S402, the control unit 111 reads information stored in the information the storage unit 301 provided on the mobile phase supply bottle 101 through the information reading unit 302, and confirms that the mobile phase supply bottle 101 is appropriately provided (Step S403). At this time, in the case in which the mobile phase supply bottle 101 to which the mobile phase has already been supplied, or in the case in which it is determined that the remaining amount of the mobile phase in the mobile phase supply bottle 101 is less, the control unit 111 displays, on the display unit 306, an instruction to provide or replace the mobile phase supply bottle 101 (Step S404).

In the case in which the control unit 111 determines that the mobile phase supply bottle 101 is in an appropriate state, the control unit 111 drives the mobile phase supply pump 103 to start the supply of the mobile phase from the mobile phase supply bottle 101 to the storage bottle 102 (Step S405).

In the case in which the air bubble sensor 303 detects air bubbles in the pipe connecting the mobile phase supply pump 103 to the mobile phase supply bottle 101 in the middle of discharging the mobile phase by the mobile phase supply pump 103 (Step S406), the control unit 111 supplies all the mobile phase in the mobile phase supply bottle 101 into the storage bottle 102, determines that the inside of the mobile phase supply bottle 101 becomes empty, and stops the mobile phase supply pump 103 (Step S408).

Subsequently to Step S408, the control unit 111 displays, on the display unit 306, an instruction for the replacement of the mobile phase supply bottle 101 (Step S410), and ends the mobile phase supply process (Step S412).

In Step S406, when the sensor 303 does not detect air bubbles in the pipe, the process goes to Step S407. In Step S407, the monitoring sensor 109 monitors overflows such that the mobile phase in the storage bottle 102 does not exceed the storage threshold capacity of the storage bottle 102 during which the mobile phase supply pump 103 supplies the mobile phase into the storage bottle 102. When the monitoring sensor 109 detects no overflow, the process returns to Step S406.

In Step S407, in the case in which the mobile phase is a specified value or more from the output value of the monitoring sensor 109, the control unit 111 determines that overflows are highly likely to occur, and detects overflows, stops the mobile phase supply pump 103, and ends the supply of the mobile phase (Step S409). In the case in which the mobile phase supply pump 103 is stopped due to the detection of overflows, the control unit 111 calculates the remaining amount of the mobile phase in the mobile phase supply bottle 101 from the drive time and flow rate of the mobile phase supply pump 103 and updates and records the remaining amount (Step S411). Then, the mobile phase supply process is ended (S412).

According to the second embodiment of the present invention, it is possible to obtain the effect similar to the first embodiment, and it is possible to obtain the following effect.

In the second embodiment, since the inside of the mobile phase supply bottle 101 is connected to the inside of the storage bottle 102 using the gas conduit 304, the internal pressure of the mobile phase supply bottle 101 and the internal pressure of the storage bottle 102 pressure are made equal. This enables avoidance of the occurrence of errors in the detection of the remaining amount of the mobile phase in the storage bottle 102 due to pressure differences, and it is possible to conduct a more accurate detection of the remaining amount.

Moreover, in the second embodiment, the configuration is provided in which the mobile phase supply bottle 101 is provided with the information storage unit 301 that records information, such as the type, date of manufacture, and the like of the mobile phase in the mobile phase supply bottle 101, the information reading unit 302 reads the information recorded in the information storage unit 301, the control unit 111 determines the presence or absence of the provision of the mobile phase supply bottle 101, faulty provision, and expiration date, and confirms that the mobile phase supply bottle 101 is appropriately provided. Thus, it is possible to recognize whether the mobile phase supply bottle 101 is appropriately provided before the operation of the mobile phase to the liquid chromatograph 100.

Furthermore, in the second embodiment, since the filter 305 is connected to the vent 110 of the mobile phase supply bottle 101, it is possible to obviate the external spread of the mobile phase in the mobile phase supply bottle 101, and it is possible to obviate the penetration of dirt and dust around the mobile phase supply bottle 101 into the mobile phase supply bottle 101.

Note that a configuration may be possible in which a monitoring sensor (a sensor similar to the monitoring sensor 109) that detects the remaining amount of the mobile phase in the mobile phase supply bottle 101 is provided, the control unit 111 recognizes the remaining amount of the mobile phase in the mobile phase supply bottle 101, and displays the remaining amount on the display unit 306.

Third Embodiment

Next, a third embodiment of the present invention will be described.

In the examples shown in the first embodiment and the second embodiment, functions of preparing the operation of a mobile phase supply bottle 101 and urging the provision will be described with reference to FIG. 5, as a stage prior to the detection of a reduction in the remaining amount of a mobile phase in a storage bottle 102 by a monitoring sensor 109 to drive a mobile phase supply pump 103.

The configuration of a liquid chromatograph in the third embodiment is similar to the configuration of the first embodiment or the second embodiment, and the drawings and the detailed description are omitted. However, it is supposed that to the first embodiment, a display unit 306 similar to that of the second embodiment is additionally provided.

FIG. 5 is an illustration of the operation of the third embodiment, showing a transition example of the remaining amount of the mobile phase in the storage bottle 102 calculated from the output value of the monitoring sensor 109, in which the vertical axis expresses the remaining amount of the mobile phase, and the horizontal axis expresses a lapse of days.

In FIG. 5, immediately after the supply of the mobile phase from the mobile phase supply bottle 101 to the storage bottle 102, the storage bottle 102 is in a state 501 in which the inside is filled with the mobile phase. When the mobile phase is consumed due to the analysis operation of the liquid chromatograph 100 or 100A, the remaining amount of the mobile phase in the storage bottle 102 is reduced. At this time, an operation preparation mobile phase remaining amount VA that urges the preparation of operation of the mobile phase supply bottle 101 is set before reaching the mobile phase remaining amount state 503 in which the control unit 111 operates the mobile phase supply pump 103.

After the remaining amount of the mobile phase in the storage bottle 102 calculated from the detected value of the monitoring sensor 109 reaches the operation preparation mobile phase remaining amount VA, the control unit 111 displays the preparation of operation of the mobile phase supply bottle 101 on the display unit 306 at that point in time (state 502).

In the case in which the liquid chromatograph of the third embodiment is formed in a configuration similar to the second embodiment, a configuration may be provided in which the control unit 111 recognizes the presence or absence of the mobile phase supply bottle 101 or the remaining amount of the mobile phase in the mobile phase supply bottle 101 at the point in time (state 502) at which the operation preparation mobile phase remaining amount VA is reached before reaching the state 503 in which the mobile phase supply pump 103 is operated, by reading the information in an information storage unit 301 provided on the mobile phase supply bottle 101 by the information reading unit 302, and in the case in which no mobile phase necessary to be supplied into the storage bottle 102 is present, the display unit 306 is caused to output instructions to provide or replace the mobile phase supply bottle 101.

According to the third embodiment, it is possible to obtain the effect similar to the first embodiment and the second embodiment, and it is possible to display the preparation of operation of the mobile phase supply bottle 101 and the like before reaching the operation preparation mobile phase remaining amount state 503 in which the control unit 111 operates the mobile phase supply pump 103. Accordingly, it is possible to conduct the preparation and replacement of the mobile phase supply bottle 101 and the like before the remaining amount of the mobile phase in the mobile phase supply bottle 101 becomes the amount necessary to supply the mobile phase to the storage bottle 102.

Fourth Embodiment

Next, a fourth embodiment of the present invention will be described with reference to FIG. 6.

In the example described in the second embodiment, in a liquid chromatograph 100B according to the fourth embodiment, a storage bottle 102 is housed in a case 601 having high light shielding properties, and in the case 601, a deuterium lamp 602 is provided.

A control unit 111 lights the deuterium lamp 602 in order to sterilize the inside of the storage bottle 102. At this time, the deuterium lamp 602 is desirably normally lit. However, since ultraviolet rays emitted from the deuterium lamp 602 have sterilization effects as well as the ultraviolet rays might become a cause of the degradation in materials, the deuterium lamp 602 may be lit by a control algorithm that provides lighting for a certain time every constant time period, every 24 hours, for example.

Moreover, in the fourth embodiment, a form is described in which ultraviolet rays are applied from the deuterium lamp 602 outside the storage bottle 102. For example, a small deuterium lamp is connected to the cap of the storage bottle 102 to directly apply ultraviolet rays to the inside of the storage bottle 102, which also expects similar effects.

Furthermore, the fourth embodiment proposes the sterilization function by the deuterium lamp 602 for the storage bottle 102 that is highly likely to store the mobile phase for a long time. The similar function may be mounted by disposing a deuterium lamp that applies ultraviolet rays on the mobile phase supply bottle 101.

According to the fourth embodiment, it is possible to obtain the effect similar to the second embodiment, and it is possible to sterilize the mobile phase in the storage bottle 102 for a long time.

LIST OF REFERENCE SIGNS

100, 100A, 100B . . . liquid chromatograph, 101 . . . mobile phase supply bottle, 102 . . . storage bottle, 103 . . . mobile phase supply pump, 104 . . . liquid feeding device, 105 . . . sample injection portion, 106 . . . separation column, 107 . . . thermostatic device, 108 . . . detection device, 109 . . . monitoring sensor, 110 . . . vent, 111 . . . control unit, 301 . . . information storage unit, 302 . . . information reading unit, 303 . . . air bubble detection sensor, 304 . . . gas conduit, 305 . . . filter, 306 . . . display unit, 601 . . . shading case, 602 . . . deuterium lamp.

The invention claimed is:

1. A liquid chromatograph comprising:

a liquid feeding device configured to feed out a mobile phase;

a sample injection portion configured to inject a sample into the mobile phase fed out from the liquid feeding device;

a separation column configured to separate the sample carried by the mobile phase fed out from the sample injection portion;

a detection device configured to detect the sample separated by the separation column;

a storage bottle storing the mobile phase fed by the liquid feeding device;

a mobile phase supply bottle configured to supply the mobile phase to the storage bottle;

a mobile phase supply pump configured to supply the mobile phase stored in the mobile phase supply bottle to the storage bottle; and a control unit configured to control an operation of the mobile phase supply pump and determine an amount of the mobile phase to be supplied from the mobile phase supply bottle to the storage bottle, wherein the liquid chromatograph further comprising:

a monitoring sensor configured to detect a remaining amount of the mobile phase stored in the storage bottle, wherein the control unit is configured to, when the remaining amount of the mobile phase in the storage bottle reaches a certain level or less based on a detection value of the monitoring sensor, drive the mobile phase supply pump to supply the mobile phase in the mobile phase bottle to the storage bottle, and when it is determined that the mobile phase in the storage bottle reaches a predetermined value or more based on the remaining amount of the mobile phase detected by the monitoring sensor, stop the mobile phase supply pump, and wherein the liquid chromatograph further comprising:

an air bubble detection sensor configured to detect air bubbles in a pipe provided between the mobile phase supply bottle and the mobile phase supply pump;

a gas conduit connecting the storage bottle and the mobile phase supply bottle and configured to keep a pressure inside the storage bottle and a pressure inside the mobile phase supply bottle at a certain level; and a filter connected to a vent of the mobile phase supply bottle, wherein the control unit is configured to drive the mobile phase supply pump to supply the mobile phase in the mobile phase supply bottle to the storage bottle, determine that the mobile phase supply bottle becomes empty by the air bubble detection sensor detecting air bubbles inside the pipe, and stop the mobile phase supply pump.

2. The liquid chromatograph according to claim 1, wherein the mobile phase supply bottle includes an information storage unit configured to store information on the mobile phase stored in the mobile phase supply bottle, and the liquid chromatograph further comprises an information reading unit configured to read the information stored by the information storage unit, and the control unit is configured to determine, based on the information read by the information reading unit and stored in the information storage unit, that the mobile phase supply bottle is appropriately provided.

3. The liquid chromatograph according to claim 1, further comprising:

a display unit, wherein the control unit is configured to, when the remaining amount of the mobile phase in the storage bottle reaches an operation preparation mobile phase remaining amount before the mobile phase supply pump is driven, display an operation preparation of the mobile phase supply bottle on the display unit.

4. The liquid chromatograph according to claim 1, comprising:

a deuterium lamp configured to irradiate the storage bottle or the mobile phase supply bottle with ultraviolet rays.

5. A method for controlling a liquid chromatograph, the liquid chromatograph comprising:

a liquid feeding device configured to feed out a mobile phase; a sample injection portion configured to inject a sample into the mobile phase fed out from the liquid feeding device;

a column configured to separate the sample carried by the mobile phase fed out from the sample injection portion; and a detection device configured to detect the sample separated by the separation column, wherein the method for controlling the liquid chromatograph comprising:

storing, in a storage bottle, the mobile phase fed by the liquid feeding device;

storing the mobile phase in a mobile phase supply bottle that supplies the mobile phase to the storage bottle;

determining an amount of the mobile phase to be supplied from the mobile phase supply bottle to the storage bottle; and supplying the mobile phase stored in the mobile phase supply bottle to the storage bottle by controlling an operation of a mobile phase supply pump, wherein the method for controlling the liquid chromatograph further comprising:

detecting, by a monitoring sensor, a remaining amount of the mobile phase stored in the storage bottle;

driving the mobile phase supply pump to supply the mobile phase in the mobile phase bottle to the storage bottle, when the remaining amount of the mobile phase in the storage bottle reaches a specified value or less based on a detection value of the monitoring sensor;

determining that the mobile phase in the storage bottle reaches a certain level or more, based on the remaining amount of the mobile phase detected by the monitoring sensor; and stopping the mobile phase supply pump, and wherein the method for controlling the liquid chromatograph further comprising:

detecting, by an air bubble detection sensor, air bubbles in a pipe provided between the mobile phase supply bottle and the mobile phase supply pump;

connecting, by a gas conduit, the storage bottle and the mobile phase supply bottle, and keeping a pressure inside the storage bottle and a pressure inside the mobile phase supply bottle at a certain level; and driving the mobile phase supply pump to supply the mobile phase in the mobile phase supply bottle to the storage bottle, determining that the mobile phase supply bottle becomes empty by the air bubble detection sensor detecting air bubbles inside the pipe, and stopping the mobile phase supply pump.

6. The method for controlling a liquid chromatograph according to claim 5, wherein the mobile phase supply bottle includes an information storage unit configured to store information on the mobile phase stored in the mobile phase supply bottle, and the method for controlling a liquid chromatograph further comprises determining, based on the information read by an information reading unit that reads the information stored by the information storage unit and stored in the information storage unit, that the mobile phase supply bottle is appropriately provided.

7. The method for controlling a liquid chromatograph according to claim 5, further comprising:

displaying an operation preparation of the mobile phase supply bottle on a display unit, when the remaining amount of the mobile phase in the storage bottle reaches an operation preparation mobile phase remaining amount before the mobile phase supply pump is driven.

8. The method for controlling a liquid chromatograph according to claim 5, further comprising:

irradiating, by a deuterium lamp, the storage bottle or the mobile phase feed bottle with ultraviolet rays.

\* \* \* \* \*